(12) United States Patent
Hirai

(10) Patent No.: US 7,409,142 B2
(45) Date of Patent: *Aug. 5, 2008

(54) RECEIVING APPARATUS, RECEIVING METHOD, AND SUPPLYING MEDIUM

(75) Inventor: Jun Hirai, Tokyo (JP)

(73) Assignee: Sony Corporation (JP)

( * ) Notice: Subject to any disclaimer, the term of this patent is extended or adjusted under 35 U.S.C. 154(b) by 376 days.

This patent is subject to a terminal disclaimer.

(21) Appl. No.: 11/089,116

(22) Filed: Mar. 24, 2005

(65) Prior Publication Data

US 2005/0163484 A1    Jul. 28, 2005

Related U.S. Application Data

(63) Continuation of application No. 09/531,730, filed on Mar. 21, 2000, now Pat. No. 6,873,787.

(30) Foreign Application Priority Data

Mar. 29, 1999    (JP)    ............... P11-087212

(51) Int. Cl.
    H04N 5/91    (2006.01)
(52) U.S. Cl. .............. 386/94; 380/201; 360/60
(58) Field of Classification Search ............. 386/33, 386/46, 94, 95, 98, 109, 104–106, 111, 112, 386/125, 126; 348/734; 360/60, 360; 380/201
    See application file for complete search history.

(56) References Cited

U.S. PATENT DOCUMENTS 5,654,747 A * 8/1997 Ottesen et al. ............. 725/1
6,266,477 B1    7/2001    Ichinoi
6,266,480 B1    7/2001    Ezaki et al.
6,496,122 B2 *  12/2002   Sampsell .............. 348/734
6,529,683 B2 *  3/2003    Mori et al. ............ 386/125
6,532,336 B2 *  3/2003    Maruyama et al. ........ 386/95
6,873,787 B1 *  3/2005    Hirai ................. 386/94

* cited by examiner

Primary Examiner—John W. Miller
Assistant Examiner—Christopher Onuaku
(74) Attorney, Agent, or Firm—Lerner, David, Littenberg, Krumholz & Mentlik, LLP

(57) ABSTRACT

Digital television broadcast signals are received and AV signals are reproduced in a common apparatus. A digital television signal is received and is separated into a compressed first video signal, a compressed first audio signal, and first copyright protection information. An AV signal is reproduced from a recording medium and is separated into a second compressed video signal, a second compressed audio signal, and second copyright protection information. The first signals and information are selected when a received operation command is a command to select the digital television broadcast channel, and the second signals and information are selected when the received operation command is a command to reproduce data. The selected signals and information are decoded to generate a decoded video signal, a decoded audio signal, and a copyright protection signal, and the copyright protection signal is added to the decoded signals to limit copying.

5 Claims, 3 Drawing Sheets

RECEIVING APPARATUS, RECEIVING METHOD, AND SUPPLYING MEDIUM

CROSS-REFERENCE TO RELATED APPLICATIONS

This application is a continuation of U.S. application Ser. No. 09/531,730, filed Mar. 21, 2000, the disclosure of which is hereby incorporated by reference herein.

BACKGROUND OF THE INVENTION

The present invention relates to a receiving apparatus, a receiving method, and a supplying medium, and more particularly to a receiving apparatus, a receiving medium, and a supplying medium having the capability of reproducing DVD (digital versatile disc) video data.

In recent years, DVD players for reproducing DVD videos have become commercially available. Audio Visual (AV) data recorded on DVD video discs is coded in a compressed form according to the MPEG (Moving Picture Experts Group)-2 standard. Therefore, DVD players have the capability of decoding the AV data into a decompressed form.

Receiving apparatus for receiving satellite digital broadcasts (such as Sky Perfect TV (trademark)) are now becoming popular. AV data of satellite digital broadcasts is supplied also in the compressed form according to the MPEG-2 standard. Therefore, receiving apparatus for receiving broadcast programs have the capability of decompressing compressed AV data.

The MPEG-2 standard will be adopted in terrestrial digital broadcasting which will begin in the near future, and receiving apparatus therefor will also have the capability of decoding AV data into a decompressed form.

However, if a certain user wants to enjoy both AV data recorded on DVD video discs and digital broadcast programs (satellite or terrestrial digital broadcasts), the user has to have both a DVD player and a set top box (apparatus for receiving digital broadcasts). Thus, the cost and the installation space become large because two devices are required.

Furthermore, to display the outputs of both the DVD player and the set top box on the same television receiver, complicated connections and operations are required.

SUMMARY OF THE INVENTION

It is an object of the present invention to provide a technique for realizing a small-sized low-cost receiving apparatus capable of receiving digital television broadcasts and also capable of reproducing DVD video discs using the same means for decoding data compressed in accordance with the MPEG-2 standard.

According to the present invention, there is provided a readable medium recorded with instructions for carrying out a method for receiving digital television broadcast signals and reproducing AV signals in a common apparatus. The method includes receiving at least one operation command provided by a user; determining whether the received operation command is a command to select a digital television broadcast signal or a command to reproduce data; when the received operation command is a command to select a digital television broadcast channel, a digital television broadcast signal is received and is separated into a first video signal coded in a compressed form according to a predetermined method, a first audio signal coded in the compressed form, and first copyright protection information; when the received operation command is a command to reproduce data, an AV signal is reproduced from a recording medium and is separated into a second video signal coded in the compressed form, a second audio signal coded in the compressed form, and second copyright protection information; the first video signal, the first audio signal, and the first copyright protection information are selected when the received operation is the command is the command to select the digital television broadcast channel, and the second video signal, the second audio signal, and the second copyright protection information are selected when the received operation command is the command to reproduce data; the selected video signal, the selected audio signal and the selected copyright protection information are decoded to generate a decoded video signal, a decoded audio signal, and a copyright protection signal; and the copyright protection signal is added to the decoded video signal and to the decoded audio signal to limit the copying of the decoded video signal and the decoded audio signal.

In the readable medium according to the present invention, as described above, a decoder is used in common for both a television broadcast signal and an AV signal reproduced from a DVD video disc, and thus it is possible to reduce the cost and the installation space of the receiving apparatus which is also capable of reproducing DVD videos.

DESCRIPTION OF THE PREFERRED EMBODIMENTS

Figure 1:
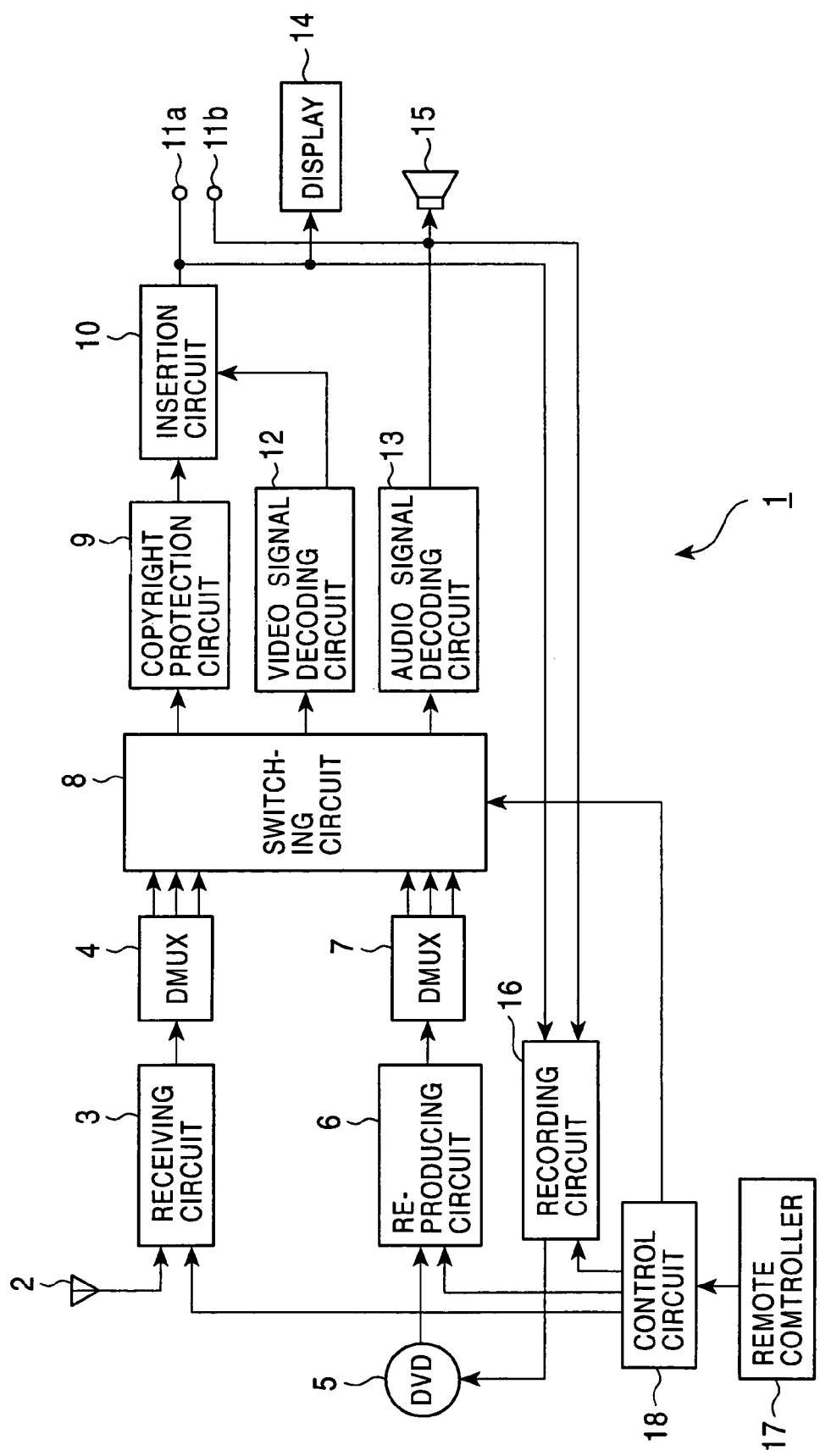
FIG. 1 is a block diagram illustrating an example of a configuration of a digital television receiver including a DVD drive according to the present invention.

Referring to FIG. 1, an example of a configuration of a digital television receiver including a built-in DVD drive according to the present invention is shown. In the digital television receiver 1 having the built-in DVD drive, a receiving circuit 3 receives a digital television broadcast wave (satellite or terrestrial digital broadcast wave) via an antenna 2 and extracts a signal (AV data coded in a compressed form according to the MPEG-2 standard) corresponding to a selection command given by a control circuit 18. The resultant signal is supplied to a demultiplexer (DMUX) 4. The demultiplexer 4 separates the signal received from the receiving circuit 3 into a video signal coded in the compressed form, an audio signal coded in the compressed form, and copyright protection information (waveform information and an APS (analog protection system) signal). These resultant signals are supplied to a switching circuit 8.

A reproducing circuit 6 reads a signal (AV data coded in a compressed form according to the MPEG-2 standard) recorded on a DVD 5 in response to a reproducing command given by the control circuit 18. The resultant signal is sent to a demultiplexer (DMUX) 7. The demultiplexer 7 separates the signal received from the reproducing circuit 6 into a video signal coded in the compressed form, an audio signal coded in the compressed form, and copyright protection information. These resultant signals are supplied to the switching circuit 8.

Under the control of the control circuit 18, the switching circuit 8 selects a video signal coded in the compressed form, an audio signal coded in the compressed form, and copyright protection information output from either the demultiplexer 4 or 7, and outputs them to a video signal decoding circuit 12, an audio signal decoding circuit 13, and a copyright protection circuit 9, respectively.

In accordance with the copyright protection information received from the switching circuit 8, the copyright protection circuit 9 generates a signal which allows the copyright of the AV data to be protected (that is, which limits the copying of the AV data).

Figure 2:
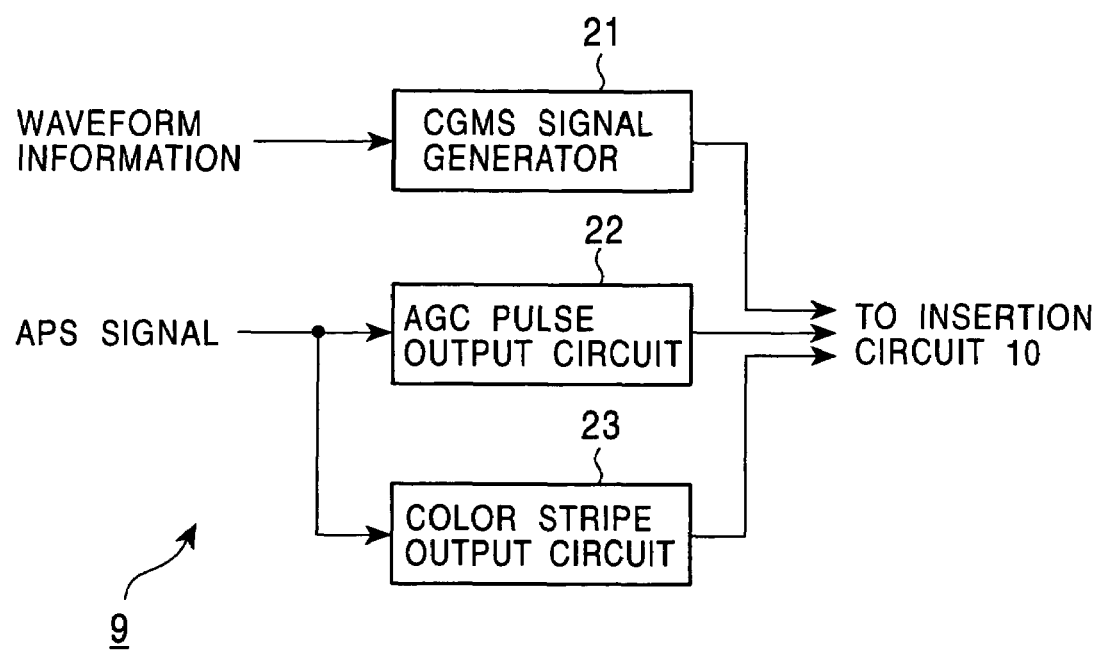
FIG. 2 is a block diagram illustrating an example of a configuration of the copyright protection circuit shown in FIG. 1.

FIG. 2 illustrates an example of a detailed configuration of the copyright protection circuit 9. In FIG. 2, a CGMS signal generator 21 generates a CGMS (copy generation management system) signal in accordance with the wave information contained in the copyright protection information and outputs it to an insertion circuit 10. The CGMS signal refers to a 2-bit signal which controls a DV (digital video) recorder so as to limit the number of times that the AV data including the CGMS signal is copied. The CMGS signal can have one of four values: 00, 10, 01, and 11, which indicate "Copyfree", "Copyonce", "Already Copied", and "Never Copy", respectively.

An AGC pulse output circuit 22 generates an AGC (automatic gain control) pulse signal in accordance with an APS (a signal indicating whether or not analog copying is allowed) contained in the copyright protection information and outputs the resultant signal to the insertion circuit 10. The AGC pulse signal refers to a signal which controls a VHS video cassette recorder so as to prevent AGC processing (prevent the AV data from being copied in a normal fashion).

A color stripe output circuit 23 generates a color stripe signal in accordance with the APS signal contained in the copyright protection information and outputs it to the insertion circuit 10. The color stripe signal refers to a signal which controls a VHS video cassette recorder so as to insert color stripes into a recorded image (thereby preventing the image from being copied in a normal fashion).

Referring again to FIG. 1, the insertion circuit 10 inserts the CGMS signal, the AGC pulse signal, and the color stripe signal supplied from the copyright protection circuit 9 into the video signal decoded by the video signal decoding circuit 12, within a V blank period thereof, and outputs the resultant video signal to an external output terminal 11a, a display 14, and a recording circuit 16. The external output terminal 11 is connected to, for example, a VHS video cassette recorder (not shown).

The video signal decoding circuit 12 decodes the video signal coded in the compressed form, supplied from the switching circuit 8, and outputs the decoded video signal to the insertion circuit 10. The audio signal decoding circuit 13 decodes the audio signal coded in the compressed form, supplied from the switching circuit 8, and outputs the decoded audio signal to the external output terminal 11b, a loudspeaker 15, and the recording circuit 16.

The display 14 displays the image of the decoded video signal supplied from the insertion circuit 10. Although the decoded video signal output from the insertion circuit 10 includes the CGMS signal and other protection control signals, those protection control signals do not act upon the display 14 and thus do not affect the image displayed thereon.

The loudspeaker 15 emits an audio signal decoded by the audio signal decoding circuit 13.

In accordance with the control signal output from the control circuit 18, the recording circuit 16 codes the video signal received from the insertion circuit 10 (that is, the video signal received, decoded, and added with the CGMS signal in the V blank period by the antenna 2) and the audio signal received from the audio signal decoding circuit 13 (that is, the audio signal received and decoded by the antenna 12) in accordance with the MPEG-2 standard and records them on the DVD 5.

A remote controller 17 includes a plurality of buttons (not shown) used by a user to issue commands to receive and select a digital television broadcast station and to reproduce or record data from or onto the DVD 5. The operation performed by the user upon a button is detected, and a corresponding operation command is applied to the control circuit 18. In response to the operation command given from the remote controller 17, the control circuit 18 outputs control commands to various circuit parts as required.

Figure 3:
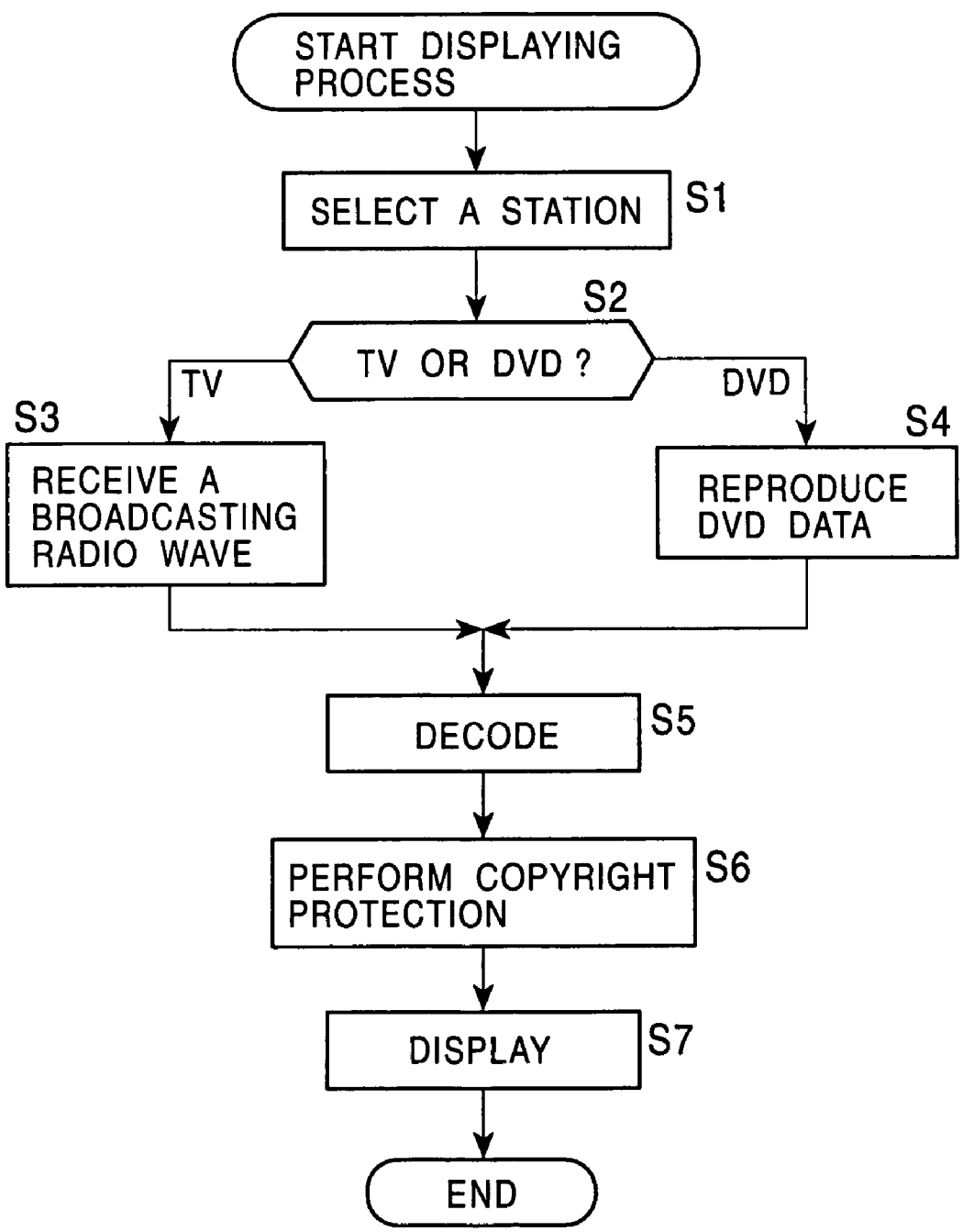
FIG. 3 is a flow chart illustrating the operation of the digital television receiver including the DVD drive.

The displaying operation of the digital television receiver including the built-in DVD drive is described below with reference to FIG. 3. In step S1, if a user issues a command to select a digital television broadcast channel or a command to reproduce a DVD 5 by pressing a button provided on the remote controller 17, the remote controller 17 supplies a corresponding operation command to the control circuit 18.

In step S2, the control circuit 18 determines whether the operation command input from the remote controller 17 is a command to select a digital television broadcast channel or a command to reproduce the DVD 5. If it is determined that the input command is a command to select a digital television broadcast channel, then the operation goes to step S3.

In step S3, the control circuit 18 outputs a control command to the receiving circuit 3 to control the switching circuit 8 such that the signals output from the demultiplexer 4 are transferred to the circuit parts following the switching circuit 8. In response to this control command, the receiving circuit 3 extracts a signal (AV data coded in the compressed form according to the MPEG-2 standard) of the selected channel of digital television broadcast waves input via the antenna 2, and outputs the extracted signal to the demultiplexer 4. The demultiplexer 4 separates the signal received from the receiving circuit 3 into a video signal coded in the compressed form, an audio signal coded in the compressed form, and copyright protection information, and outputs these signals to the switching circuit 8. Under the control of the control circuit 18, the switching circuit 8 outputs the video signal coded in the compressed form, input from the demultiplexer 4, to the video signal decoding circuit 12, the audio signal coded in the compressed form to the audio signal decoding circuit 13, and the copyright protection information to the copyright protection circuit 9.

In step S5, the video signal decoding circuit 12 decodes the video signal coded in the compressed form, received from the switching circuit 8, and outputs the decoded video signal to the insertion circuit 10. The audio signal decoding circuit 13 decodes the audio signal coded in the compressed form, applied from the switching circuit 8.

In step S6, the CGMS signal generator 21 generates a CGMS signal in accordance with the wave information contained in the copyright protection information and outputs it to the insertion circuit 10. The AGC pulse output circuit 22 generates an AGC pulse signal in accordance with the APS contained in the copyright protection information and outputs the resultant signal to the insertion circuit 10. The color stripe output circuit 23 generates a color stripe signal in accordance with the APS signal and outputs it to the insertion circuit 10. The insertion circuit 10 inserts the CGMS signal, the AGC pulse signal, and the color stripe signal received from the copyright protection circuit 9 into the video signal decoded by the video signal decoding circuit 12, within the V blank period thereof, and outputs the resultant video signal to the external output terminal 11a and the recording circuit 16. In synchronization with the output of the video signal, the audio signal decoding circuit 13 outputs the audio signal, decoded in step S5, to the external output terminal 11b, the loudspeaker 15, and the recording circuit 16.

In step S7, the display 14 displays the image of the video signal decoded by the video signal decoding circuit 12. The loudspeaker 15 emits the audio signal decoded by the audio signal decoding circuit 13.

If it is determined in step S2 that the input command is a command to reproduce the DVD 5, then the operation goes to step S4.

In step S4, the control circuit 18 outputs a control command to the reproducing circuit 6 to control the switching circuit 8 such that the signals output from the demultiplexer 7 are transferred to the circuit parts following the switching circuit 8. In response to this control command, the reproducing circuit 6 reads a signal (AV data or the like coded in the compressed form according to the MPEG-2 standard) from the DVD 5 and outputs it to the demultiplexer 7. The demultiplexer 7 separates the signal received from the reproducing circuit 6 into a video signal coded in the compressed form, an audio signal coded in the compressed form, and copyright protection information, and outputs these resultant signals to the switching circuit 8. Under the control of the control circuit 18, the switching circuit 8 outputs the video signal coded in the compressed form, input from the demultiplexer 7, to the video signal decoding circuit 12, the audio signal coded in the compressed form to the audio signal decoding circuit 13, and the copyright protection information to the copyright protection circuit 9.

Thereafter, step S5 and the following steps are performed.

In the digital television receiver 1 including the built-in DVD drive according to the preferred embodiment described above, unlike the case where a set top box for receiving a digital television broadcast and a DVD player are separately connected to a display, the MPEG decoder (including the video signal decoding circuit 12 and other parts) having a relatively large circuit size, the power supply, and the housing are used in common, and thus reductions in the installation space and the cost are achieved and an increase in reliability is also achieved. Furthermore, users are not required to connect cables for transmitting signals such as a video signal.

Furthermore, in the preferred embodiment, because the digital AV data can be processed without needing conversion into analog form, degradation in the bandwidth of data and occurrences of cross-color and dot interference are suppressed, and thus the image quality is improved.

In the embodiment described above, when AV data of a digital television broadcast is recorded on the DVD 5, the received AV data is first decoded into the decompressed form and then coded again into the compressed form. Alternatively, the received AV data in the compressed form may be directly recorded, or the decoded AV data (in analog form) may be recorded.

The present invention may also be applied to other devices such as a set top box for digital cable television.

The computer program for performing the above-described process may be supplied to a user via an information recording medium such as a magnetic disk or a CD-ROM and also via a network medium such as the Internet and a digital satellite.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer-readable medium having recorded therein a computer program having instructions for carrying out a method for receiving digital television broadcast signals and reproducing AV signals in a common apparatus, said method comprising:

receiving at least one operation command provided by a user;

determining whether the received operation command is a command to select a digital television broadcast channel or a command to reproduce data;

when the received operation command is a command to select a digital television broadcast channel:

receiving a digital television broadcast signal, and separating the received digital television broadcast signal into a first video signal coded in a compressed form according to a predetermined method, a first audio signal coded in the compressed form, and first copyright protection information;

when the received operation command is a command to reproduce data:

reproducing an AV signal from a recording medium, and separating the reproduced signal into a second video signal coded in the compressed form, a second audio signal coded in the compressed form, and second copyright protection information;

selecting the first video signal, the first audio signal, and the first copyright protection information when the received operation command is the command to select the digital television broadcast channel and selecting the second video signal, the second audio signal, and the second copyright protection information when the received operation command is the command to reproduce data;

decoding the selected video signal, the selected audio signal, and the selected copyright protection information to generate a decoded video signal, a decoded audio signal, and a copyright protection signal; and adding the copyright protection signal to the decoded video signal and to the decoded audio signal to limit the copying of the decoded video signal and the decoded audio signal.

2. A computer-readable medium according to claim 1, wherein the predetermined method is a method according to the MPEG-2 standard.

3. A computer-readable medium according to claim 1, wherein the recording medium is a DVD.

4. A computer-readable medium according to claim 1, wherein said method further comprises recording the received digital television broadcast signal onto the recording medium.

5. A computer-readable medium according to claim 1, wherein said method further comprises displaying an image based on the decoded video signal and emitting sound based on the decoded audio signal.

* * * * *